United States Patent [19]

Hautemont

[11] Patent Number: 4,814,123

[45] Date of Patent: Mar. 21, 1989

[54] PROCESS FOR REGULATING THE HEATING OF A THERMOPLASTIC BAND USED IN A THERMOFORMING STATION

[75] Inventor: Jean-Claude Hautemont, Gif Sur Yvette, France

[73] Assignee: Erca Holding, Les Ulis Cedex, France

[21] Appl. No.: 192,644

[22] Filed: May 11, 1988

Related U.S. Application Data

[62] Division of Ser. No. 078,989, Jul. 29, 1987, Pat. No. 4,758,145.

[30] Foreign Application Priority Data

Jul. 31, 1986 [FR] France ................. 86 11151

[51] Int. Cl.⁴ .................... B29C 51/42; B29C 51/46
[52] U.S. Cl. .......................... 264/40.6; 264/522
[58] Field of Search .............. 73/159, 838; 264/40.1, 264/40.4, 40.6, 284, 294, 295, 320, 322, 297.6, 522, 551; 374/52; 425/135, 140, 141, 143, 169, 170, 384, 394, 398, 400, 403.1, 519

[56] References Cited

U.S. PATENT DOCUMENTS

| | | | |
|---|---|---|---|
| 2,966,792 | 1/1961 | DiPieri | 73/838 |
| 3,412,183 | 11/1968 | Anderson et al. | 264/40.6 |
| 3,774,440 | 11/1973 | Martinelli | 374/52 |

*Primary Examiner*—Jan H. Silbaugh
*Assistant Examiner*—Jill L. Heitbrink
*Attorney, Agent, or Firm*—Dennison, Meserole, Pollack & Scheiner

[57] ABSTRACT

A process for regulating the heating of a thermoplastic band used in a station for thermoforming upwardly open containers, the process being characterized in that, in a zone of the softened thermoplastic band, zone surrounded by a mesh of rigidified matter, the degree of deformation of this zone under the action of a predetermined mass is measured, the measured value of the degree of deformation is compared with a predetermined reference value corresponding to a good aptitude to thermoforming, and the heating of the band is regulated as a function of the value of deformation measured so that the deformation corresponds to the reference value.

3 Claims, 1 Drawing Sheet

4,814,123

PROCESS FOR REGULATING THE HEATING OF A THERMOPLASTIC BAND USED IN A THERMOFORMING STATION

This is a division of co-pending application Ser. No. 078,989, filed on July 29, 1987, now U.S. Pat. No. 4,758,145, issued 7/19/88.

FIELD OF THE INVENTION

The present invention relates to a process and device for regulating the heating of a thermoplastic band used in a thermoforming station.

BACKGROUND OF THE INVENTION

This invention relates to a process for regulating the heating of a thermoplastic band used in a station for thermoforming upwardly open containers, of the type in which the thermoplastic band is firstly heated section by section over the major part of its width except for thin marginal zones adapted to be gripped by a step-by-step advance device, up to a softening temperature rendering it suitable for thermoforming, then said band is cooled so as to create therein a sort of meshed network of which the meshes are constituted by rigidified thermoplastic matter and each surround a zone of thermoplastic matter softened to the thermoforming temperature and corresponding to the extent and location of the upper opening of one of the forming chambers of a molding unit provided in the thermoforming station, and finally, the band thus cooled is advanced by one step into said thermoforming station, causing the softened zones to coincide with the openings of the forming chambers before proceeding with the thermoforming operation proper.

It has been proven that the softened zones of the thermoplastic band are not always at a temperature appropriate for thermoforming, with the result that the containers are torn during thermoforming or present wall zones of considerably unequal thicknesses.

It has already been proposed to measure the temperature of the thermoplastic band when it leaves the heating zone, but the temperature has proved not to be representative of the aptitude of the band for thermoforming.

It is an object of the present invention to overcome the drawbacks set forth hereinabove and to propose a process for regulating the heating of the thermoplastic band so that it is in all circumstances in the optimum state of thermoforming.

SUMMARY OF THE INVENTION

In a process of the type mentioned hereinbefore, this object is attained in accordance with the invention by measuring, in a zone of the softened thermoplastic band, zone surrounded by a mesh of rigidified matter, the degree of deformation of this zone under the action of a predetermined mass, comparing the measured value of the degree of deformation with a predetermined reference value corresponding to a good aptitude to thermoforming, and regulating the heating of the band as a function of the value of deformation measured so that said deformation corresponds to the reference value.

Thanks to this design, it is possible to give the thermoplastic band a constant aptitude to thermoforming by regulating the heating of the band virtually continuously, the aptitude to thermoforming being variable as a function of the conditions of thermoforming (ambient temperature, thickness of the band, matter constituting the band, power of absorption of the heat radiation by the thermoplastic band, variation of the voltage of the electricity supply network, etc. . . ).

The present invention also relates to a device for regulating the heating of a thermoplastic band used in a station for thermoforming containers from a thermoplastic band, of the type comprising a unit for advancing a thermoplastic band step by step, and, mounted in series, a heating box comprising a plurality of heating resistors, connected to a source of current via a regulating unit, a unit for locally and selectively cooling the band as well as a thermoforming station comprising in a molding unit a plurality of upwardly open forming chambers, the cooling unit comprising two alveolate cooling plates of which one is disposed above and the other below the path of advance of the band, with the result that the cells of each plate coincide with one another and with the zones of band intended for thermoforming and positioned after an advance step has been made above the openings of the forming chambers.

This type of known device makes it possible to regulate only the temperature of heating of the thermoplastic band for a predetermined dwell time thereof in the heating box. In this case, it is absolutely impossible to take into account, rapidly and virtually instantaneously, the variations of certain parameters which influence the aptitude of the band to thermoforming, such as ambient temperature, thickness of the band, capacity of absorption of the infrared radiation by the band, the chemical composition of the band, etc...

It is therefore a further object of the present invention to propose a device for regulating the heating of the thermoplastic band to give the latter a good constant aptitude to thermoforming despite the variation of certain parameters having some influence on the aptitude to thermoforming of the band in question.

This object is attained according to the invention in that the device further comprises a feeler disposed above a cell of the upper alveolate plate and capable of abutting in a cell against the zone of thermoplastic band delimited by said cell, a displacement sensor capable of measuring the displacement of the feeler whilst the latter stamps or deforms under the effect of its weight the zone of band in question, a comparator of which one of the inputs is connected to the output of the displacement sensor, a generator of a reference signal corresponding to a predetermined length of displacement of the feeler, this generator being connected to the other input of the comparator, and an electronic heating regulator controlled from the outside which is interposed in the supply circuit of at least a part of the elctrical resistors of the heating box and of which the gate or outer control element is connected to the output of the comparator.

Thanks to this arrangement, the thermoplastic band is permanently maintained at or taken to a heating temperature which gives it a constant good aptitude to thermoforming, i.e. to stamping, despite the variations of certain outside parameters. In fact, up to the present time, the heating temperature was pre-regulated before leaving the device manufacturing workshop at a predetermined value for thermoplastic band having determined physical characteristics for this band to arrive in the thermoforming station with a good aptitude to thermoforming. This device had to be regulated again as soon as its conditions for use in the plant manufacturing the containers were different from those of the preregulation workshop. Similar difficulties occurred when the quality of the thermoplastic band was changed, etc... All these drawbacks are overcome thanks to the device according to the invention.

BRIEF DESCRIPTION OF THE DRAWINGS

The invention will be more readily understood on reading the following description with reference to the accompanying drawings, in which.

DETAILED DESCRIPTION OF THE INVENTION

Figure 1:
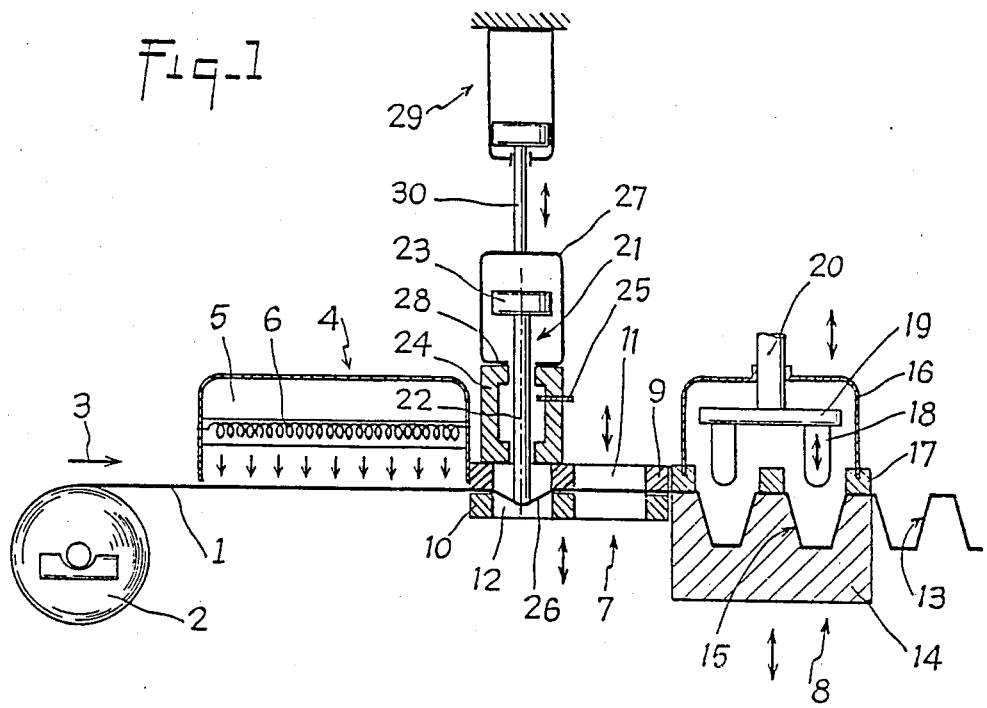
FIG. 1 is a schematic side view in elevation of an embodiment of the device according to the invention.

Referring now to the drawings, the device for regulating the heating of a thermoplastic band 1 unwound from a storage reel 2 and advanced step by step in the direction of arrow 3, comprises a heating box 4 presenting inside an enclosure 5 a plurality of heating resistors 6, preferably of the rapid response type. These heating resistors 6 are preferably disposed longitudinally, in the direction of displacement 3 of the band 1, thereabove. However, it is also possible to provide heating resistors below the thermoplastic band 1. The device also comprises, immediately downstream—in the direction of advance 3 of the thermoplastic band 1—of the heating box 4, a unit 7 for locally and selectively cooling the thermoplastic band 1 as well as a thermoforming station 8.

The local and selective cooling unit 7 comprises an upper horizontal alveolate plate 9 of which the cells 11, 12 coincide vertically with each other and define on the thermoplastic band 1 closed zones from which will be made, at the following thermoforming station 8, containers 13 which, after having been stripped, will still be attached to said band 1. Of course, these containers 13 will subsequently be filled with a product, covered with a sealed lid and cut-out from the thermoplastic band 1. The two alveolate plates 9, 10 are mobile vertically so as to be able to move slightly away from the band or to be able to grip it therebetween. When these alveolate plates 9, 10 are in contact with the thermoplastic band 1 previously heated to the thermoforming temperature, the corresponding band parts are cooled so as to form a network of rigidified meshes, whilst the band zones located opposite the cells 11, 12 maintain their thermoforming temperature and are surrounded by the rigidified meshes of the meshed network.

The thermoforming station 8 comprises, below the thermoplastic band 1, a molding unit 14 which comprises a plurality of forming chambers 15 and is vertically mobile between an upper thermoforming position (cf. FIG. 1) and a lower stripping position in which the containers 13 which have just been formed may be advanced by one step with the thermoplastic band to which they are still attached. Above the thermoplastic band 1, the thermoforming station 1 presents a bell 16 connected to a source of compressed air and provided at its base with an alveolate holding-down plate 17 which, during thermoforming, is applied against the thermoplastic band 1 supported at the meshes of the network of rigidified meshes by the upper face of the molding unit 14. Inside the bell 16 are provided a plurality of forming punches 18 of which each is disposed opposite one of the forming chambers 15 and is fixed, at its upper end, to a support plate 19 borne by a control rod 20 hermetically passing through the upper part of the bell 16 and connected to a control jack (not shown) imparting thereto a reciprocating vertical movement during the thermoforming operation.

As may be seen in the drawings, the length of an advance step of thermoplastic band 1 corresponds to the length of the cooling plates 9, 10 and to that of the molding unit 14 and holding-down clamp 17, length taken in the direction of advance 3 of the thermoplastic band 1, the length of the heating box 4 being able to be a whole multiple of this advance step.

The device also comprises, above one of the cells 11 of the upper cooling plate 9, a feeler 21 presenting a vertical rod 22 and, if necessary, at the upper end thereof, a gripping disc 23, the rod 22 being guided vertically in a guiding housing 24 resting, by its lower end, on the upper cooling plate 9, so that the feeler 21 is centred with respect to the corresponding cell 11 of said plate 9. In addition, the device is provided with a displacement sensor 25 which is fixed in the guiding casing 24, so as to be able to detect the descending movement of the rod 22 of the feeler 21, i.e. the degree of deformation or of stamping of the zone of thermoplastic band 26 delimited by the corresponding cell of the cooling plate 9, deformation due to the weight of the feeler 21. The structure of the sensor 25 is known per se and may be of the capacitive, inductive, solenoid plunger, etc... type.

The gripping disc 23 of the feeler 21 is topped by a connecting stirrup element 27 of which the lower drive fingers 28 are folded radially towards the rod 22 of the feeler 21 so as to be able to grip from below the gripping disc 23 of the feeler 21 and to lift the latter under the action of a jack 29 of which the control rod 30 is fast with the upper end of the stirrup 27. Before the end of the descending stroke of the jack 29, the radial fingers 28 of the stirrup 27 are separated from the disc 23 of the feeler 21 since the lower end of the rod 22 thereof comes into contact with the thermoplastic band 1 in the zone 26 thereof and the feeler 21 then deforms this zone 26 under the effect of its own weight during a determined time less than the time gap separating two successive advance steps of the band 1. The deformation of the zone 26 of the band 1 brings about a vertical displacement of the feeler 21, this displacement being measured by sensor 25 provided in the guiding casing 24. It should be noted that, at the end of descending stroke, the connecting stirrup 27 rests on the guiding casing 24 and the length of the feeler 21 is sufficient in order that, for this lower position of the stirrup 27, the disc 23 is still sufficiently apart from the fingers 28 of the stirrup 27 and still allows the feeler 21 to descend (cf. FIG. 1). Of course, the feeler 21 is raised before each advance of the thermoplastic band 1 and the cooling plate 10 is lowered sufficiently to allow the deformed zone 26 of the said band 1 to pass, whilst, at the end of advance of the band 1, the feeler 21 is again lowered so as to rest freely on a zone of band surrounded by a cell 11.

It will be readily understood that, to raise the feeler 21 and to give it a certain freedom in axial displacement during its penetration into the thermoplastic band 1, with respect to its lifting means 29, other connecting means may be used, for example of the type comprising a jack rod provided with an oblong hole in which is engaged a lateral lug fast with the upper end of the rod 22 of the feeler 21.

Figure 2:
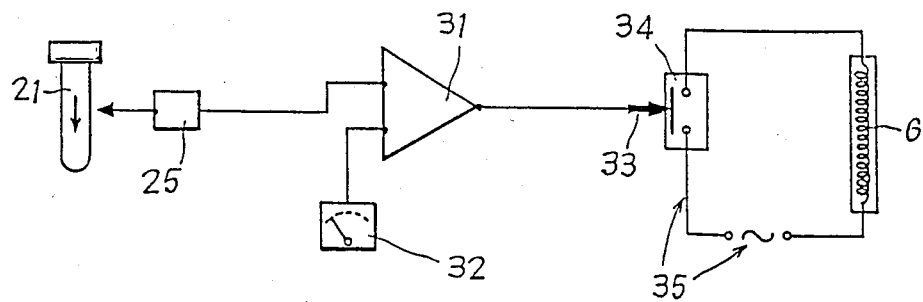
FIG. 2 is a schematic view of the circuit controlling the supply circuit of the resistors of the heating box.

FIG. 2 schematically shows the circuit controlling the descending displacement of feeler 21. This circuit comprises a sensor 25 measuring the displacement of feeler 21 under its own weight and against the resistance opposed by zone 26 of the thermoplastic band. The output of sensor 25 is connected to one of the input terminals of a comparator 31 of which the other input terminal is connected to the output of a reference signal generator 32 for example constituted by a calibration potentiometer which furnishes an output value corresponding to a good aptitude of band 1 to thermoforming.

The output of the comparator 31 is connected to the outside control member 33 of an electronic heating regulator such as a static switch 34 with outside control which is interposed in the supply circuit 35 of at least a part of the heating resistors 6 of the heating box 4. The comparator 31 is designed for example so that it furnishes at its output a control signal as long as the signal corresponding to the displacement of the feeler 21 has not attained the value of the reference signal furnished by the generator 32. In that case, the switch 34 is of the type which remains closed and establishes the circulation of a supply current as long as its control member 33 receives the output signal of the comparator 31. The static switch 34 may be constituted for example by a triac, a thyristor or an equivalent electronic circuit. Instead of employing a static switch and functioning by all or nothing, an electronic voltage variator may also be used, controlled by a signal of which the value corresponds to the depth of penetration of the feeler so as to effect regulation of the heating of the band 1 as a function of the penetration of the feeler (regulation of the proportional, integral, derivative type).

In order to avoid the heating of the thermoplastic band 1 being different in the lateral zone and in the central zone, it is advantageous to provide two different heating circuits, each having heating resistors 6, a supply circuit 35 and a control circuit 25, 31, 32, 33, 34, independent of those of the other heating circuit. In that case, a feeler 21 and the sensor 25 corresponding to the first heating circuit are disposed opposite a cell 11 in the plate 9, cell located opposite the central or median zone of the thermoplastic band 1 and another feeler 21 and its sensor 25 corresponding to the second heating circuit are disposed opposite a cell 11 in the plate 9, cell located above one of the two lateral zones of said thermoplastic band 1, the heating resistors 6 of the first circuit being placed in the heating box 4 opposite the central zone of the thermoplastic band 1 and the resistors 6 of the other heating circuit being disposed in two groups of which each is associated with one of the two lateral zones existing on either side of the central zone of said band 1.

The embodiments described hereinabove may, of course, undergo a certain number of modifications without departing from the scope of protection as defined by the accompanying Claims.

What is claimed is:

1. A process for regulating the heating of a thermoplastic band used in a station for thermoforming upwardly open containers, in which the thermoplastic band is first heated section by section over a major part of its width except for thin marginal zones adapted to be gripped by a step-by-step advance device, up to a softening temperature rendering said band suitable for thermoforming, then said band is cooled to create therein a meshed network of which the meshes are constituted by rigidified thermoplastic matter and each mesh surrounds a zone of thermoplastic matter softened to the thermoforming temperature and corresponding to the extent and location of an upper opening of one of a plurality of forming chambers of a molding unit provided in the thermoforming station, and finally, the band thus cooled is advanced by one step into said thermoforming station, causing the softened zones to coincide with the openings of the forming chambers before proceeding with the thermoforming operation, the process comprising the following steps of:

abutting a predetermined mass against the zone of the softened thermoplastic measuring, in the zone of the softened thermoplastic band, the zone surrounded by the mesh of rigidified thermoplastic matter, a degree of deformation of this zone under the action of the predetermined mass, comparing the measured value of the degree of deformation with a predetermined reference value corresponding to a good aptitude to thermoforming, and regulating the heating of the band as a function of the value of deformation measured so that said deformation corresponds to the reference value.

2. The process of claim 1, wherein the zone of which the degree of deformation of the thermoplastic band is measured is a central band zone and the heating of said central zone is controlled as a function of the degree of deformation measured.

3. The process of claim 1, wherein the zone of which the degree of deformation of the thermoplastic band is measured is a lateral band zone and the heating of said lateral zone is controlled as a function of the degree of deformation measured.

* * * * *